United States Patent [19]
Cardellini

[11] Patent Number: 5,826,121
[45] Date of Patent: Oct. 20, 1998

[54] ADJUSTABLE CAMERA SUPPORT BASE FOR LOW CAMERA POSITIONING

[76] Inventor: Steven L. Cardellini, 22 Council Crest, Corte Madera, Calif. 94925

[21] Appl. No.: 917,241

[22] Filed: Aug. 25, 1997

[51] Int. Cl.[6] .................................................. G03B 17/00
[52] U.S. Cl. .............................................................. 396/428
[58] Field of Search ............................................. 396/428

[56] References Cited

U.S. PATENT DOCUMENTS 3,586,278  6/1971  Simons ................................... 396/428

OTHER PUBLICATIONS

Photographs of three–legged high hat, (also known in industry as New York high hat or Dexter high hat), pp. 1–4, date unknown but believed to be pre–1996.
Photographs of high hat with gear head, p. 5, date unknown but believed to be pre–1996.
Photographs of high hat with fluid head, p. 6, date unknown but believed to be pre–1996.
Photographs of low hat with fluid head, p. 7, date unknown but believed to be pre–1996.
Photographs of Bazooka with 3–way levelling, p. 8, date unknown but believed to be pre–1996.
Photograph of Modern Studio Equipment Bazooka mount. p. 1. Date unknown but believed to be pre–1996.
Photograph of Grip Jet Bazooka mount. pp. 2–3. Date unknown but believed to be pre–1996.

*Primary Examiner*—David M. Gray
*Attorney, Agent, or Firm*—Limbach & Limbach L.L.P.

[57] ABSTRACT

An adjustable base for a motion picture camera, particularly suited to low level positioning of the camera. The base includes a camera mount, legs supporting the camera mount, and feet which rest on the floor or other supporting surface. The legs can be interchanged and adjusted for height and can be pivoted relative to the mount about a vertical axis, thus enabling the user to control the camera level and to position the feet at suitable positions on the floor or other supporting surface.

19 Claims, 2 Drawing Sheets

ADJUSTABLE CAMERA SUPPORT BASE FOR LOW CAMERA POSITIONING

FIELD OF THE INVENTION

The present invention relates to the field of photography, specifically to a base for motion picture cameras.

BACKGROUND OF THE INVENTION

When a motion picture camera is on a static base, it is often mounted on a tripod. Conventional tripods include the well known "standard" tripods as well as the so-called "baby" tripods which permit lower positioning of motion picture cameras. These types of tripods include a mount on top of three legs which rest on the floor, ground or other supporting surface.

Typically, a camera is mounted to a camera head supported by the tripod mount and the three telescoping legs of the tripod are positioned on the supporting surface. The tripod legs are adjustable such that higher positioning of the camera can be achieved by elongating the telescoping legs and lower positioning can be attained by shortening the legs.

In some instances, very low positioning of the camera is required. Tripods are not suitable in these instances because very low positioning of a tripod would require very small legs which would be too unstable for supporting a motion picture camera, or it would require extending the tripod legs so broadly across the supporting surface that the legs would splay, causing the camera to topple. Bases known as "high hats" are therefore often used in situations requiring lower camera positioning.

There are a number of types of high hats. A first type is a plywood based unit comprised of a stationary mount fixed to a flat plywood base. While suitable when the high hat is positioned on flat surfaces, this type of high hat can be awkward and difficult to stabilize on sloped or uneven surfaces. Leveling and height adjustment of the high hat (and thus the motion picture camera mounted to the high hat) require positioning wooden wedges, cribbing, and or spacers (known as "apple boxes") beneath the wooden platform. Precise height adjustment can be difficult to achieve given that these spacers are frequently available only in limited thicknesses of 8 inches, 4 inches, 2 inches and 1 inch. Moreover, the combination of apple boxes, wedges, etc. beneath the plywood base can compromise the stability of the high hat, particularly on steep or uneven surfaces, and the broad plywood base of the high hat prevents the camera from being positioned close to a vertical obstruction such as a wall.

A second type of high hat is commonly referred to as a three-legged high hat, New York high hat, or Dexter high hat. The three-legged high hat includes a mount and three L-shaped legs (or a pair of U-shaped legs and a single L-shaped leg) extending from the mount. Each leg is rotatable about a horizontal axis to increase or decrease the angle of the leg with respect to the floor or ground and to thereby increase or decrease the height of the mount. The legs of the three-legged high hat extend outwardly from the device when the mount is in a low position and therefore consume a great deal of floor space. Moreover, this type of high hat cannot be effectively used with a gear head because the frame of the high hat can interfere with the wheels which comprise the manual controls for the gear head.

It is therefore desirable to provide a mounting device for a motion picture camera which allows for the kind of low positioning provided by a low hat, but which is suitable for use on sloped and uneven surfaces without consuming a large amount of floor or ground space.

SUMMARY OF THE INVENTION

The present invention is a multi-adjustable base for a motion picture camera which is particularly suitable for low level positioning of the camera. The invention includes a mount and a plurality of arms extending laterally from the mount. Each arm is rotatable relative to the mount so that each arm may be separately rotated towards or away from the mount. A leg is mounted to each arm and is positionable on the ground, floor or other supporting surface for supporting the adjustable base. The leg is slidable relative to the arm to adjust the height of the arm relative to the floor or supporting surface. The height of each arm is separately adjustable to permit leveling of the device on uneven surfaces. The rotatable arms allow a user to select the position of each leg on the supporting surface and thus allow user control over the size and shape of the base's "footprint."

DETAILED DESCRIPTION OF THE PREFERRED EMBODIMENTS

Structure

Figure 1:
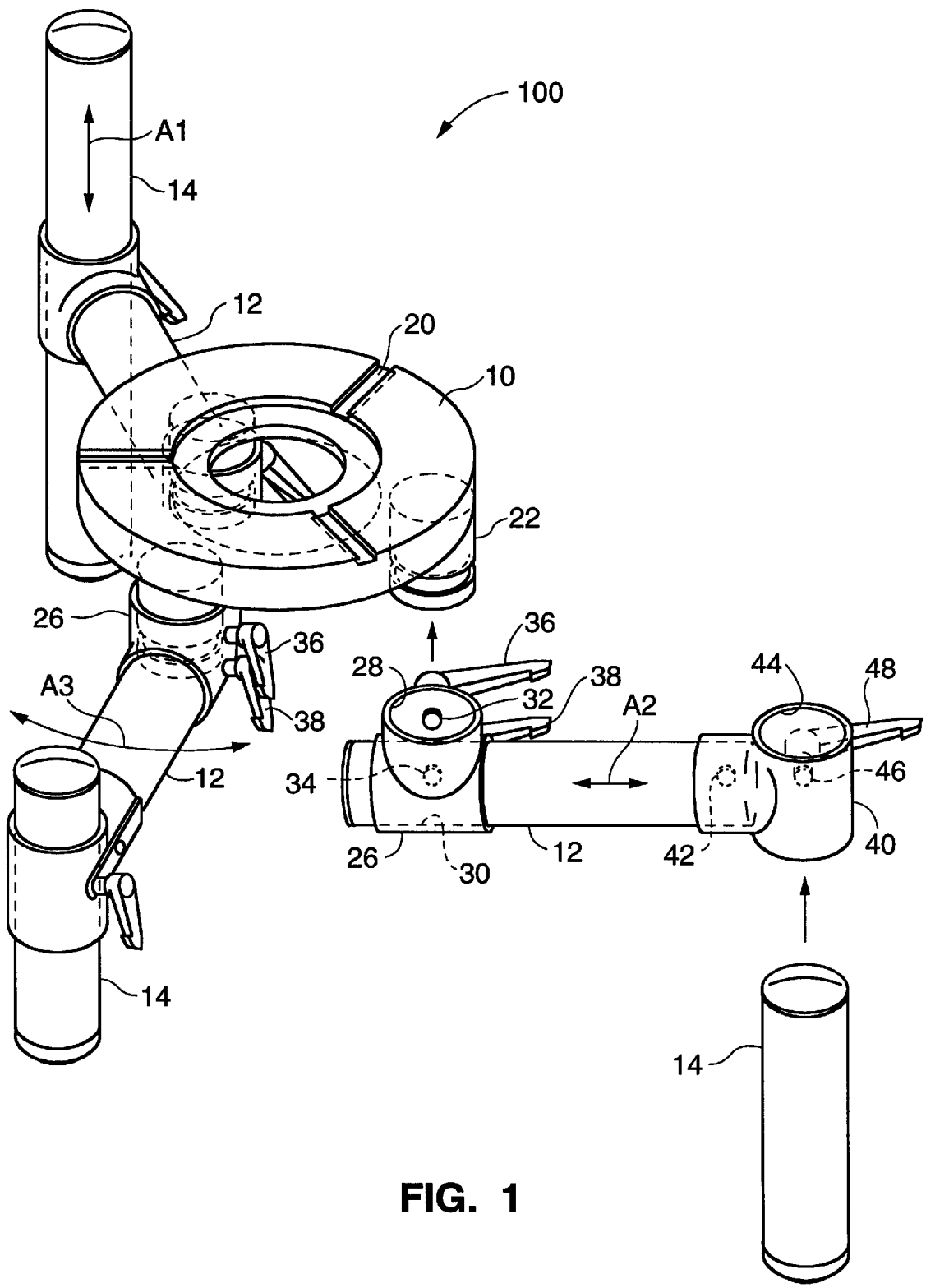
FIG. 1 is a partially exploded perspective view of the adjustable base according to the present invention.

Referring to FIG. 1, the support base 100 according the present invention generally includes a mount 10, arms 12 extending laterally of the mount 10, and legs 14 connected to the arms 12. During use of the base 100, a camera head (not shown) is mounted to the mount 10 and a camera (also not shown) is mounted to the camera head. The legs 14 rest on the floor, ground or other supporting surface.

Figure 2:
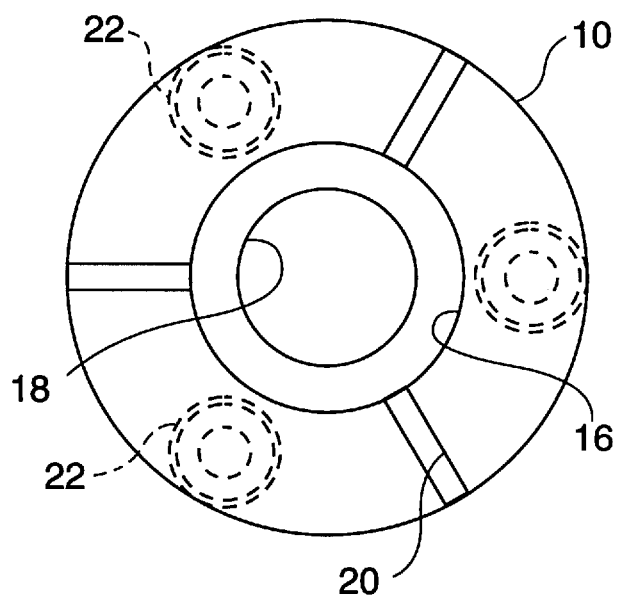
FIG. 2 is a top view of the mount of the adjustable base of FIG. 1.
Figure 3:
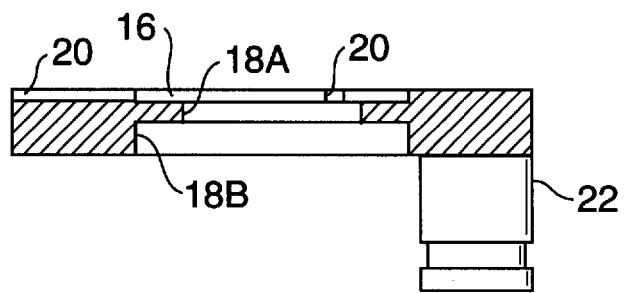
FIG. 3 is a cross-section view of the mount of FIG. 2, taken along the plane designated 3—3 in FIG. 2.

FIGS. 2 and 3 show a top view and a side section view, respectively, of mount 10. The mount may be one of a number of types commonly used for mounting camera heads, such as a ball mount or the Mitchell mount shown in the drawings. The Mitchell mount has a cylindrical shape and includes a recessed central portion 16 and a circular cutout 18 centered within central portion 16. As shown in FIG. 3, cutout includes a first section 18a having a first diameter and a section 18b having a second, larger, diameter.

At least one keyway 20 is provided in the upper surface of the mount 10. The keyway 20 is proportioned to mate with a standard key on the base of a camera head and to therefore secure the camera head on the mount. Three such keyways 20 are preferably provided so that a minimum amount of rotation of the camera head is needed to cause the key to seat in a keyway.

A plurality of, and preferably three, support members 22 extend perpendicularly from the mount 10. Each support member 22 is preferably cylindrical in shape and includes a circumferential groove 24. Support members 22 may be hollow to minimize the mass of the base.

Each support member 22 is provided with a fitting 26 having first and second cylindrical openings 28, 30 which are oriented perpendicularly to one another. Threaded bores extend through the fitting 26 into respective ones of the cylindrical opening 28, 30, and threaded pins 32, 34 are seated within the bores. Each pin 32, 34 includes a handle 36, 38, which allows the pin 32, 34 to be easily rotated and thus advanced into and withdrawn from its corresponding bore.

Each support member 22 is slidably received in the first cylindrical opening 28 of its corresponding fitting 26. Pin 32 seats in the groove 24 of support member 22 and may be securely tightened against the support member 22 by rotating the pin 32 using the handle 36.

A first end of arm 12 is slidably received in the second cylindrical opening 30 and may be secured in place by tightening pin 34 against the surface of the arm 12 using handle 38. A second fitting 40 is mounted to a second end of the arm 12 and may be permanently fixed to the arm 12 such as by a bolt 42 or other fastening means. Each second fitting 40 has a cylindrical bore 44 which slidably receives a leg 14, and further includes a pin 46 and handle 48 which allow the leg 14 to be secured within the bore 44. Although the legs and arms need not be slidable within their corresponding fixtures, the slidable connections between these components are highly desirable in that they allow the height and width of the base to be easily adjusted.

In a preferred embodiment, standard 1 ¼" diameter pipes (for arms 12 and legs 14) and fittings 26, 40 are used in order to allow the present invention to be incorporated into custom filming rigs such as automobile rigs or manlift rigs.

Operation

During use of the adjustable base 100 according to the present invention, a camera head is seated on the mount 10 such that the key extending from the camera head is disposed within one of the keyways 20. A camera is mounted to the camera head. Because the support members 22 cause the mount 10 to be higher than the arms 12 and other components, the base 100 of the invention may be used with a gear head because the support members 22 provide clearance for the wheels of the gear head.

The features of the base 100 allow the user to adjust the height of the base and to position of the legs 14 to accommodate the location at which the camera is to be positioned. Each adjustment will be described separately, however it should be appreciated that the adjustments may frequently be made in combination with one another in order to best adapt the base to the desired camera location.

The height of the base 100 is adjusted by loosening the pins 46 using handles 48, sliding the legs 14 within the fittings 40 (see arrow Al in FIG. 1) to change the effective lengths of the legs (i.e. the length of each leg between the ground/floor and the corresponding arm). The pins 46 are retightened once the proper height is achieved. In one embodiment, the mount 10 may be positioned at a height as low as 3 ¼ inches from the ground or floor. A slightly higher mount, such as 5 ½ inches, may also be desirable, particularly if use of a gear head is desired.

Because the legs are separately adjustable, each may be adjusted to a different height in order to accommodate uneven or sloped surfaces. Longer legs may be substituted for one or more of the legs 14 if needed. For example, if a camera is to be positioned on stairs, one or two of the legs 14 may be replaced with longer legs, and the base then positioned with the longer legs resting on a step that is lower than the step on which the shorter leg or legs is positioned. As another example, longer legs may be used if it is desired to position a camera on the floor of an automobile, so that the legs may be arranged to straddle the "hump" on the automobile floor. Switching the arms 12 and legs 14 may be suitable for this purpose. As a third example, the film crew may "dutch" the camera, i.e., tilt it out of level to one side or another, by using legs of differing lengths and by attaching shot bags to the arms or legs to add stability to the base.

Two mechanisms are provided for adjusting the "footprint" of the base 100. One adjustment is made by loosening one of the pins 34 using its handle 38, and then sliding the corresponding arm 12 within the fitting 26 to increase or decrease the effective length of the arm relative to the mount 10 (see arrow A2, FIG. 1). Another adjustment is made by loosening the pin 32 using handle 36, and rotating the fitting 26 relative to the support member 22 (see arrow A3) to pivot the arm 12 relative to the mount 10. It should be noted that the pin 34 slides within the groove 24 in the support member 22 during rotation of the fitting 26 and thereby prevents the fitting 26 from separating from the support body.

In this way, the orientations of arms 12 may be adjusted to allow the base 100 to fit within the allocated space. For example, if the camera must be positioned adjacent to a vertical obstruction such as a wall, two of the legs may be rotated such that they are parallel to the wall (and thus separated from one another by an angle of 180°), thus allowing the mount 10 to positioned directly adjacent to the wall. Moreover, the overall width of the base 100 can be reduced by positioning the arms 12 so that the second fittings 40 are drawn close to the mount 10, thereby allowing for easy transport and storage of the base.

The present invention has been described with respect to a single embodiment. However, several modifications to the configuration of the invention can be made without departing from the scope of the invention. The invention is not intended to be limited to the specific embodiment described herein but should instead only be limited in terms of the claims that follow.

I claim:

1. An adjustable base for a camera, the base comprising:
a mount configured to receive a camera head;
a plurality of arms extending laterally of the mount, the arms independently adjustable relative to the mount; and
a plurality of legs adjustably attached to and supporting the arms.

2. The adjustable base according to claim 1 wherein the arms are rotatably attached to the mount.

3. The adjustable base according to claim 1 wherein the arms are slidably attached to the mount.

4. The adjustable base according to claim 1 wherein the arms are slidably and rotatably attached to the mount.

5. The adjustable base according to claim 1 wherein the legs are slidably attached to the arms.

6. The adjustable base according to claim 2 wherein the legs are slidably attached to the arms.

7. The adjustable base according to claim 3 wherein the legs are slidably attached to the arms.

8. The adjustable base according to claim 4 wherein the legs are slidably attached to the arms.

9. The adjustable base of claim 1 wherein the arms and legs are detachable from the mount and interchangeable with one another.

10. The adjustable base of claim 1 wherein the arms are detachable from the mount and the legs are detachable from the arms.

11. An adjustable base for a camera, the base comprising:
a mount configured to receive a camera head;
a plurality of arms extending laterally of the mount, each arm independently pivotable relative to the mount ; and
a plurality of legs connected to the arms.

12. The adjustable base of claim 11 wherein the arms are slidably attached to the mount.

13. The adjustable base of claim 11 wherein the legs are slidably attached to the arms.

14. The adjustable base of claim 12 wherein the legs are slidably attached to the arms.

15. The adjustable base of claim 11 wherein the arms and legs are detachable from the mount and are interchangeable with one another.

16. A method of positioning a camera, comprising the steps of:
   (a) providing a base including a mount, a plurality of arms extending laterally of the mount, each arm independently pivotable relative to the mount, and a plurality of legs extending laterally of the arms;
   (b) pivoting at least one of the arms about its axis of rotation to move the arm towards or away from the mount;
   (c) placing the base at a filming location with the legs supporting the arms and mount; and
   (d) attaching a camera head and camera to the mount.

17. The method of claim 16, further comprising the step of sliding at least one of the arms relative to the mount to increase or decrease the effective length of the arm.

18. The method of claim 16 further comprising the step of sliding at least one of the legs relative to its corresponding arm to increase or decrease the effective length of the leg and to thereby adjust the height of the corresponding arm.

19. The method according to claim 16, further comprising the steps of:
   detaching the arms from the mount; and
   interchanging the arms with the legs.

* * * * *